United States Patent [19]

Orton

[11] Patent Number: 4,996,620

[45] Date of Patent: Feb. 26, 1991

[54] ELECTROMAGNETIC TRANSDUCERS HAVING E-SHAPED CORES AND SHIELDING THEREBETWEEN

[75] Inventor: Gregory A. Orton, Fremont, Calif.

[73] Assignee: Ampex Corporation, Redwood City, Calif.

[21] Appl. No.: 434,670

[22] Filed: Nov. 9, 1989

Related U.S. Application Data

[62] Division of Ser. No. 116,110, Oct. 30, 1987, Pat. No. 4,894,738.

[51] Int. Cl.[5] ...................... G11B 5/265; G11B 5/115
[52] U.S. Cl. .................................... 360/121; 360/118; 360/122
[58] Field of Search ............... 360/121, 118, 119, 122, 360/123, 124, 129

[56] References Cited

U.S. PATENT DOCUMENTS

| 3,526,725 | 9/1970 | Camras | 360/118 |
|---|---|---|---|
| 3,969,771 | 7/1976 | Suzuki et al. | 360/124 |
| 4,291,352 | 9/1981 | Gooch | 360/124 |
| 4,758,917 | 7/1988 | Gooch | 360/124 |
| 4,787,002 | 11/1988 | Isozaki | 360/118 |

*Primary Examiner*—David J. Severin
*Attorney, Agent, or Firm*—Harry G. Thibault; Douglas M. Gilbert

[57] ABSTRACT

A magnetic transducer of the erasing type, in which the coil is pre-wound to achieve greater manufacturing economy; and in which for the same reason, and also for electromagnetic operating efficiency, the core is laminated with each lamination being of one-piece fabrication. However, the single transducing gap in the core is too small to permit threading the coil thereon. Therefore, the core is formed of flexible material so that the gap can be enlarged to accept the coil during assembly. Alternatively, the core can be fabricated initially with an enlarged gap, and the flexible core is then bent to provide a desired gap length after the coil is assembled thereon. A variational form of the invention has two erase gaps and one record-play gap with a separate coil therefor.

3 Claims, 5 Drawing Sheets

FIG_5

FIG_6

FIG_7

FIG_8

FIG_9

FIG_10

FIG_11

ELECTROMAGNETIC TRANSDUCERS HAVING E-SHAPED CORES AND SHIELDING THEREBETWEEN

This is a divisional of copending application patent application Ser. No. 07/116,110 filed on 10/30/87, now U.S. Pat. No. 4,894,738.

BACKGROUND OF THE INVENTION

This invention relates to magnetic recording, and particularly to transducers therefor.

Known are electromagnetic transducers for writing, reading, and erase-before-writing on magnetic media composed of randomly-oriented oxide particles fixed in a binder, or alternatively on high-coercivity metallic tapes or discs.

Also known are transducers in which a C-shaped, magnetically-permeable core is linked with a prewound electrically-conducting coil for manufacturing economy; but in most of these the transducing gap (at the open side of the C-shape) is too small for threading a prewound coil onto the core, and either the coil must be wound upon the core in the first instance, which can be time-consuming and difficult, or such cores are made in two or more parts, which can be brought together in the final assembly, after being threaded with the prewound coil.

However, every break in the magnetic circuit of the core constitutes, in effect, a low-permeabilty gap that reduces the efficiency of the transducer, i.e., the ratio of the strength of drive signal to flux output.

While a magnetic transducer must have at least one transducing gap, at which the magnetic field bulges outwardly to affect the recording medium, or upon playback, where the core becomes most sensitive to the magnetic fields recorded in the recording medium, it nevertheless follows that any gap that is not needed for transducing, causes a loss of efficiency for the transducer; and this is true even though the parts of a two-part core are pressed tightly together in abutting relation.

Furthermore, most ferrite and other high-permeability, high-saturation and low-coercivity substances of which cores are made in the magnetic recording art, are too brittle for bending without breaking, or are decreased in permeability by the stress of bending, to the degree that the lesser evil, two-part construction, has always been the more acceptable.

Nonetheless, an arrangement in which a prewound coil can be assembled on a high-quality core, without unacceptable, degradation of performance, would always be desirable.

It would also be desirable to adapt such an arrangement to operate a pair of gaps for erasing high-coercivity recording media, and further to associate therewith a record-playback gap and coil in a one-piece-lamination core construction.

OBJECTS OF THE INVENTION

Accordingly, it is an object of the invention to provide an optimally high-performance transducer structure that is manufacturable at minimal cost and without unacceptably degrading the performance characteristics of this structure.

BRIEF DESCRIPTION OF THE INVENTIVE STRUCTURE

In accordance with the above object, the present invention provides a magnetic transducer of the erasing type, in which the coil is prewound to achieve greater manufacturing economy; and for this same reason, and also for electromagnetic operating efficiency, the core is laminated with each lamination being of one-piece fabrication. However, the single transducing gap in the core is too small for threading the coil thereon. Therefore, the core is formed of flexible material so that the gap can be enlarged to accept the coil during assembly. Alternatively, the core can be fabricated initially with an enlarged gap, and the flexible core is then bent to provide a desired gap length after the coil is assembled thereon. A variational form of the invention has two erase gaps and one record-play gap with a separate coil therefor.

DESCRIPTION OF THE DRAWINGS

Other objects and advantages of the present invention will be manifest in the following description, illustrated by the accompanying drawings, in which.

DETAILED DESCRIPTION OF THE PREFERRED EMBODIMENT

Figure 1:
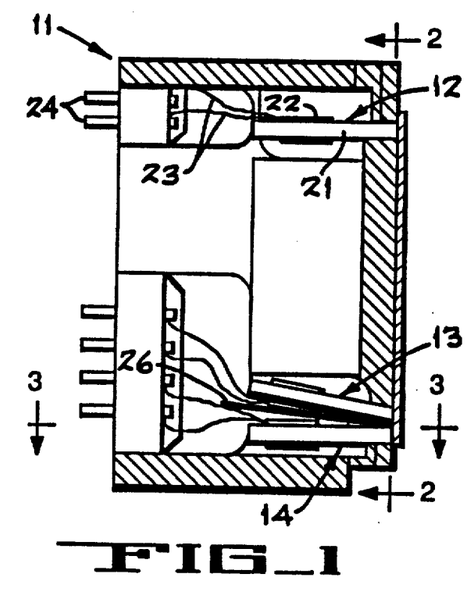
FIG. 1 is an elevational cross-sectional view taken along the plane of line 1—1 of FIG. 2, showing the construction of a double-gap erase head for high-coercivity magnetic tapes.
Figure 2:
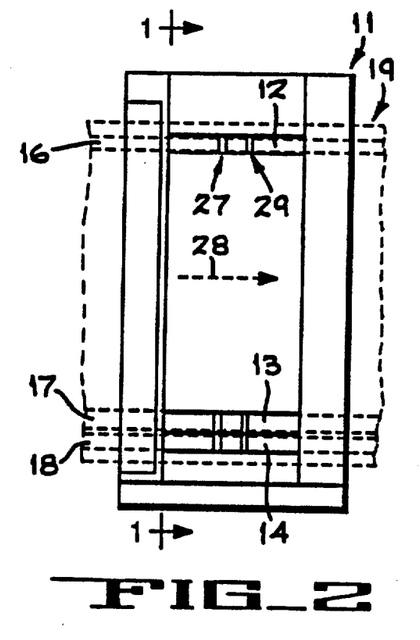
FIG. 2 is a front elevational view taken along the plane of line 2,2 of FIG. 1.

Referring now to FIGS. 1 and 2, there is shown a free standing erase head 11 including three transducers 12, 13, 14 for erasing audio, control and timing tracks, 16, 17, 18 respectively, near the edges of a magnetic tape 19, which has a helically recorded digital signal recorded on the wide middle portion thereof. The digital signal is separately erased by other structure not part of this invention.

Each transducer (e.g. transducer 12 in FIG. 1) is composed of a magnetically-permeable core 21 linked to an electrically-conducting coil 22, which is connected by leads 23 to a pair of terminals 24 projecting from the rear of the head structure. A shielding member 26 of soft or oxygen-free copper, is mounted between the closely-adjacent control and timing transducers. Each core is generally E-shaped, defining a pair of transducing gaps 27 (located upstream, in the direction 28 of tape motion) and 29 (downstream).

Each core is formed of thin laminations 21a (FIGS. 3 and 6), stacked in the direction of the gap width (same as the width direction of the tape) to reduce eddy-current losses, as is well-known in the art.

What is novel about these laminations, in combination with the other elements of the invention, is that each of them is fabricated in one integral part, so as to maximize the permeability of the core and minimize cross-talk between channels. It is widespread practice today to use prewound coils in magnetic transducers, which use generally calls for two-part construction of the core, because the gap length 31 is almost always smaller than the minimum dimension of the prewound coil (i.e., the diameter of the conductor in the case of the one-layer coil illustrated); and, on the other hand, materials currently in general use for fabricating cores are too brittle to be bent or deformed without breaking, and the coil cannot be slipped onto the core, unless the core is made in two or three parts and assembled after the coil is mounted.

Unfortunately, each break in the physical integrity of the core constitutes, in effect, a gap that is of no use for transducing, but yet produces the effects of a transducer: namely bulging of the field outwardly with resultant crosstalk between channels, and reduction of the flux efficiency parameter of the core, i.e., the ratio between input and output signal strengths; in other words loss of efficiency.

Previously, the only alternative to multi-part core construction has been to wind the coil directly on the core; but the cores used in magnetic recording are so tiny that this method has been either impossible in the case of the middle leg of an E-form core, or too expensive in other cases, except for very high volume production.

For many years, however, several materials for core construction have been available with sufficient flexibility for non-destructive bending to the degree that is required in the present invention. Two are described as follows:

A Hitachi high saturation material is currently marketed under the trade name "Tufperm":

| Nickel | 81.18 percent |
|---|---|
| Molybdenum | 2.01 percent |
| Niobium and Titanium | 4.05 percent |
| Iron | Balance |

A Carpenter Technology Corp. (San Diego) high saturation material is presently marketed under the trade-name "HyMu-800-HWR":

| Aluminum | .26 percent |
|---|---|
| Copper | .001 percent |
| Silicon | .001 percent |
| Phosphorous | .001 percent |
| Manganese | .001 percent |
| Silicon | .004 percent |
| Nickel | 80.55 percent |
| Molybdenum | 4.85 percent |
| Iron: | Balance |

It will be noted that these materials have a substantial proportion of iron, which, along with nickel, provides the required flexibility. The only other core material that is suitable for magnetic transducing, and that has so great an iron content, is ferrite, which consists of pressed and sintered iron particles in a brittle binder having no flexibility, and which is therefore unsuitable for the present invention. Most other known materials are also too brittle. The brittleness in all cases results from a need for hardness, which ensures long wear life under the abrasive action of oxide-particle or metal tapes. In the Hitachi material, hardness is provided by the titanium; in the Carpenter "800"material, by the aluminum doping.

Figure 5:
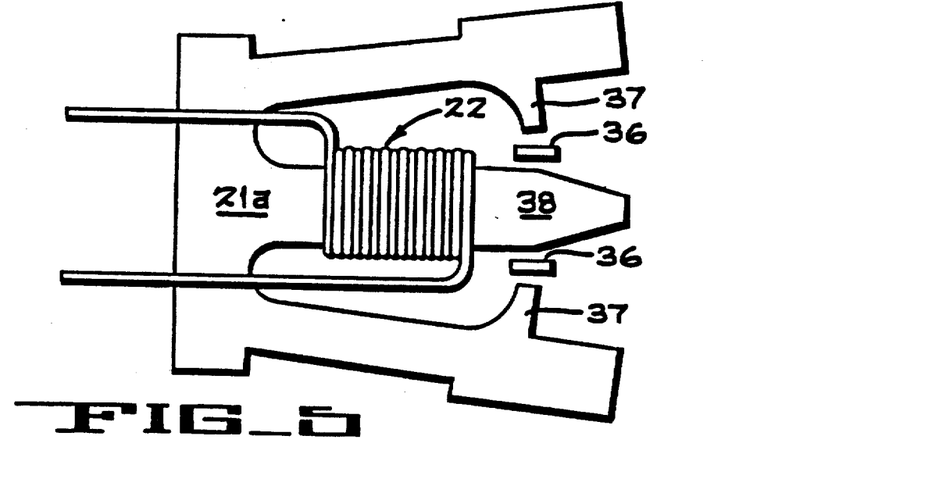
FIG. 5 is a plan view of the core stack of FIG. 3, showing the assembly thereon of a prewound coil.

As shown in FIG. 5, after the laminations have been bonded together in the stack, the pole pieces of the stack are carefully spread apart, and the coil 22 is slipped on the central arm of the E-shape.

Figure 3:
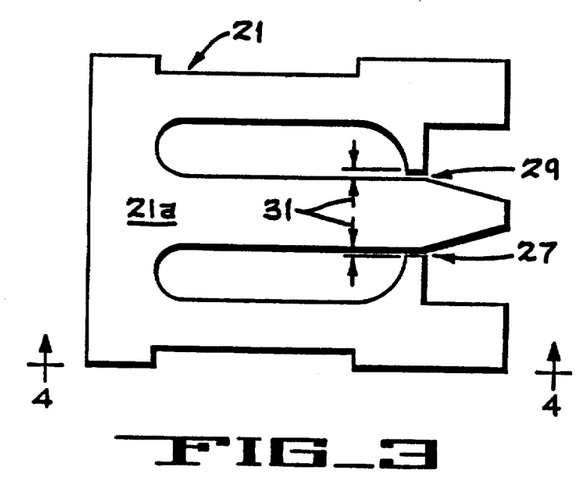
FIG. 3 is an enlarged plan view taken on the plane of lines 3—3 of FIG. 1, and shows the top lamination in the core stack of one of the transducers of FIGS. 1 and 2.
Figure 4:
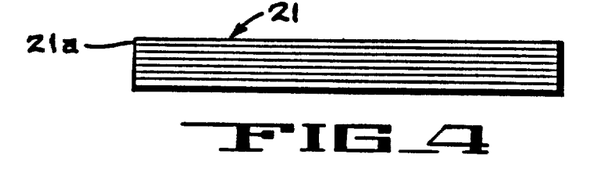
FIG. 4 is a side elevation view of the stack of laminations shown in FIG. 3, and taken along the plane of line 4—4 of FIG. 3.
Figure 6:
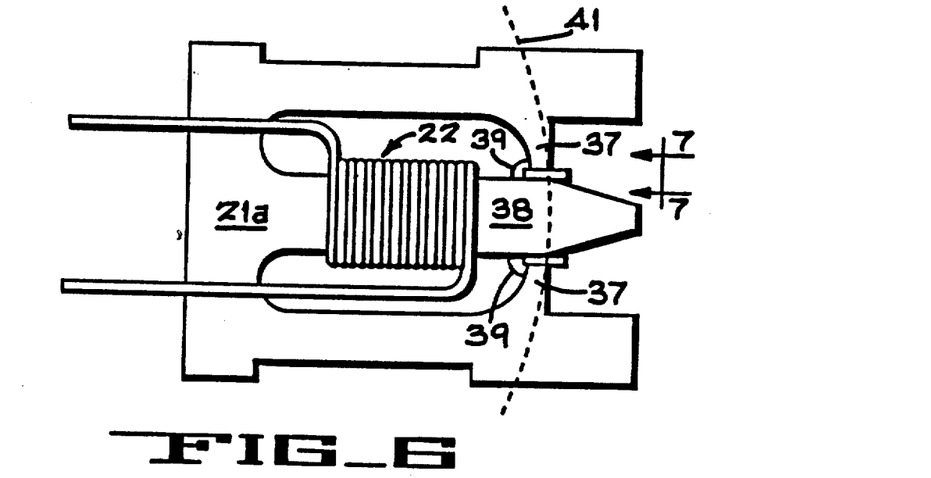
FIG. 6 is a plan view of the lamination of FIG. 5 showing further steps in the assembly process.

The lamination piece might be fabricated in the distended shape shown in FIG. 5 rather than that of FIG. 3, requiring then only to be bent or deformed once, from the distended to the final shape of FIG. 6. However, this method, though feasible, would be more wasteful since the blank would be larger. Anyhow, the loss due to working the material occurs when it is first deformed, and is not substantially increased by further working.

It should be remarked that, while the core material is bendable or flexible, it is not elastic, that is, not springy or resilient, and unable to rebound unaided from the distorted form of FIG. 5 to the final form of FIG. 6, and must be forcibly re-deformed to final form.

It should also be remarked that the permeability loss resulting from deformation is disadvantageous in a record-play transducer, but acceptable in an erase transducer such as that of the present invention. The reason is related to the difference in gap lengths needed for the two functions, as explained below for an illustrative example:

A short record gap length minimizes demagnetization fields which results in better short wavelength recordings. Conversely, long gap lengths as used in erase transducers, produce very large demagnetization fields which are desirable for erasing tape.

A record-reproduce gap is made very short, typically less than 100 micro-inches (2.5 micrometers), in order to achieve short wave length response, in accordance with the well-known equation:

$$\text{wave length} = \text{velocity/frequency}$$

Typical frequencies for record-reproduce are from 20-20,000 Hz. at e.g., 5 inches per second tape velocity.

The total reluctance of a magnetic circuit may be calculated as a function of the arithmetic sum of the "interior" reluctance of the core path ($R_c$) plus the "exterior" reluctance of the air gap ($R_g$); following the general equation for reluctance (R):

$$R = \text{path length/(permeability} \times \text{path cross-section area)} \quad (1)$$

For the air gap path, the permeability of air is unity, and in this example the gap tracking width is 0.035 inches, and gap depth is 0.0075 inches, so for 0.003 inches erase gap length the reluctance is:

$$R_g = 0.003/(1 \times 0.035 \times 0.0075) = 0.00762$$
$$cm/(1 \times 0.089 \, cm \times 0.019 \, cm = 4.5 \, rels \quad (2)$$

Similarly, for a short gap (read-write) of length 100 micro-inches, the reluctance may be calculated:

$$R_g = 0.15 \text{ rels} \quad (3)$$

In the present example, the core path length is 1.02 inches, or 2.59 cm., and the core cross-sectional area is 0.0316 sq. cm.

The permeability of unworked (unbent, unstressed) "Tufperm", the Hitachi material, is about 40,000 mu, and this drops to about 5,000 mu after working. So, reluctance of the core before working is:

$$R_c = 2.59/(40,000 \times 0.0316) = 0.0021 \quad (4)$$

and after working, the core reluctance is:

$$R_c = 2.59/(5000 \times 0.0316) = 0.016 \quad (5)$$

For total inductance (L) of the circuit, the equation is:

$$L = 0.4 \, PI \times N^2 \times 10^{-8}/(R_g + R_c) \quad (6)$$

in which "N" is the number of turns in the coil; in this case N=87.

For the long erase gap, the total inductance of the transducer before stressing the core is:

$$L = 0.0001/(4.5 + 0.002) = 0.000022 \text{ hy}$$

and after stressing, the result is:

$$L = 0.0001/(4.5 + 0.016) = 0.000022 \text{ hy}$$

In other words, there is no discernable loss of performance.

For the short read-write gap, however, the inductance before stressing is:

$$L = 0.001/(0.15 + 0.002) = 0.00066 \text{ hy} \quad (9)$$

and after stressing:

$$L = 0.0001/(0.15 + 0.016) = 0.00060 \text{ hy} \quad (10)$$

representing an eleven percent loss in performance.

The phenomenon can be characterized, therefore, by saying that in a long gap the loss due to stressing the material (from $R_c = 0.0021$ to $R_c = 0.016$, equations (4) and (5) above) is so small in comparison with the loss contributed by the gap length (4.5 rels, equation (2) above), that the stressing loss is negligible; whereas, for a short gap, the loss due to stressing (same, from $R_c = 0.0021$ to $R_c = 0.016$) is much larger in comparison to the loss due to gap length (0.15 rels, equation (3) above). Consequently, in a short gap, the stressing loss is not negligible, although in some uses it may be tolerable. For an erase head, however, which is the subject of the present invention, the bent or stressed condition of the core is no disadvantage, and the other advantages of the present invention are obtained without trade-offs or penalties for stressing.

A discussion of the stressing loss effect for HyMu-800-HWR is given in "New Wear-Resistant Permalloy Material for Magnetic Recording-Head Application" by Stephen A. Bendson, Journal of the Audio Engineering Society, Volume 24, No. 7, September 1976, pages 562-566.

Following the assembly of the coil on the middle pole piece, a very low-permeability gap spacer 36, usually of mica, or a phenolic resin, is inserted between the pole pieces 37,38, the core is closed by reverse bending (FIG. 6) to establish the minimum dimension of the gap precisely as the thickness of the mica spacer 36, and the spacer and adjacent pole-pieces are permanently joined by beadings 39 of epoxy adhesive bridging the inside faces of the pole pieces.

After this, the assembled transducer is ground to its final smooth, curved contour as illustrated by the dashed line 41.

Figure 7:
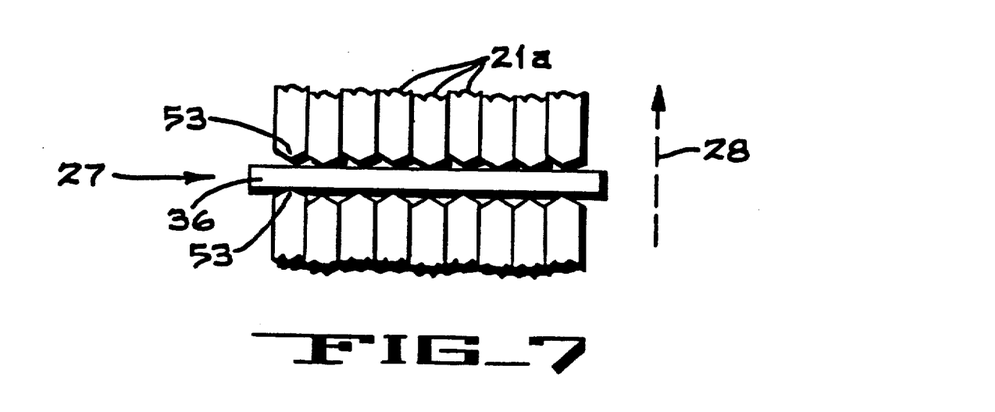
FIG. 7 is an enlarged fragmentary view of a portion of the laminations taken along the plane of line 7—7 of FIG. 6.

Referring now to FIG. 7, there is illustrated in magnified and fragmented form a number of the laminations 21a in the vicinity of the gap 27. The mica shim 36 is shown spacing apart the confronting pole piece portions 53, which are illustrated as being wedge-shaped, a shape that is produced by a process of "chemical milling".

In this process, the lamination is entirely fabricated by an etching process, beginning with a blank, which is painted all over with a photoresist substance impervious to a chosen etching acid, such as ferric chloride, except of course for the area that is not to be part of the finished lamination. The lamination is then repeatedly passed through a spray of the acid, which impinges on both sides until the shape is etched out, leaving the shape as shown in FIG. 3, and the pointed, wedge-shaped confronting faces 53 as shown in FIG. 7.

The non-parallel orientations of the confronting faces is of advantage in an erase transducer, for the same reason that it would be a disadvantage in a read-write transducer, namely, that it tends to produce a generalized array of recorded signal fields, without abrupt or strong transitions such as would be seen as a signal by a read head. The "demagnetizing" field recorded by the erase head may be termed too "diffused" to be read as a meaningful signal.

This diffusing effect is increased by the fact that random differences in the effectiveness of the acid etching, from lamination to lamination, together with minor unavoidable mis-alignments of the laminations when they are assembled for bonding, produce a randomly staggered alignment as shown in FIG. 7, with peaks and valleys, represented by the tips of adjacent pole pieces.

As see in FIG. 7, in the final alignment, only a few of the pointed tips, constituting the highest "peaks" in the alignment distribution, may actually be in contact with the shim 36. The voids between the wedge-shaped portions and the shim 36 are of course filled by the epoxy of beadings 39 when they are applied.

The phenomenon of "diffusion" may best be characterized by noting that the staggered array of erase gap edges across the tape causes each erase "signal" to be recorded not in a straight line laterally across the track, and so a read head, which does read in a straight line laterally across the tape, is able to read only diffuse, mixed up results. This is the normal state of an erased tape: no intelligible signals, no strong, discrete changes in the magnetic dispositions on the tape.

Figure 8:
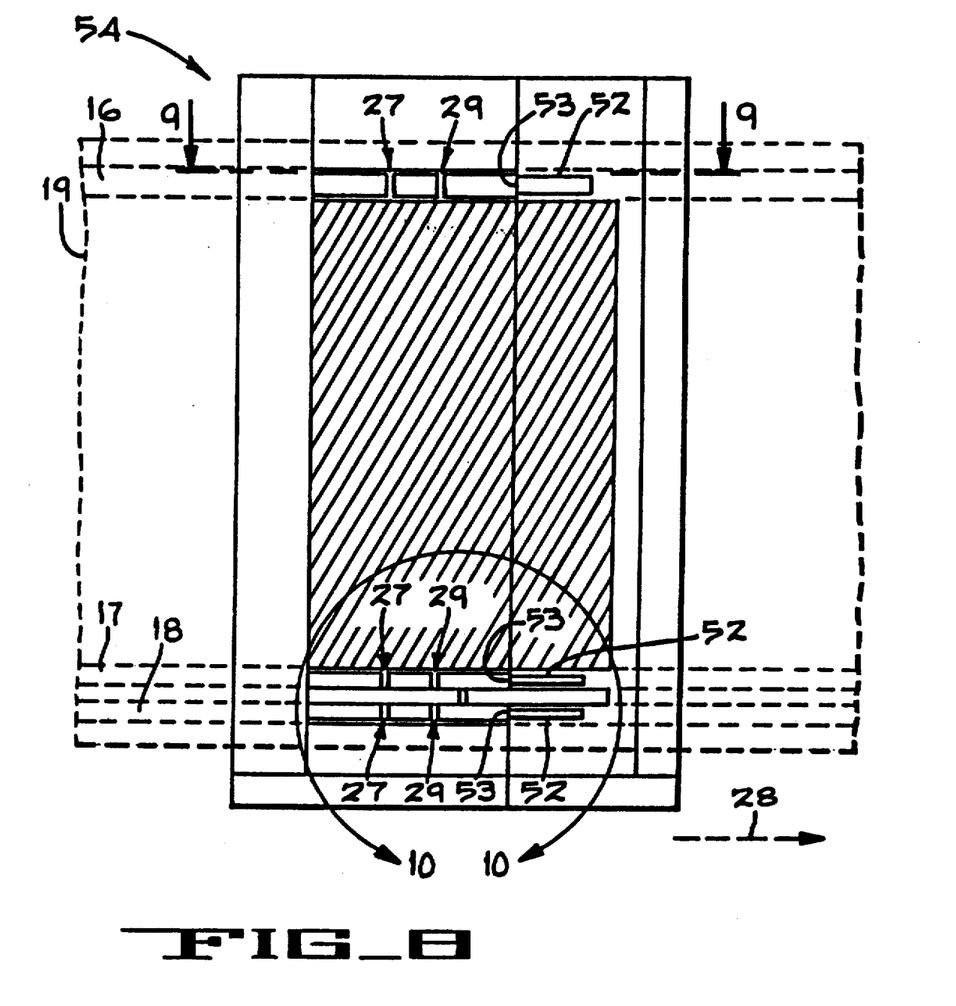
FIG. 8 is a front elevational view of a combination erase-write-read head utilizing the structure of the invention.
Figure 9:
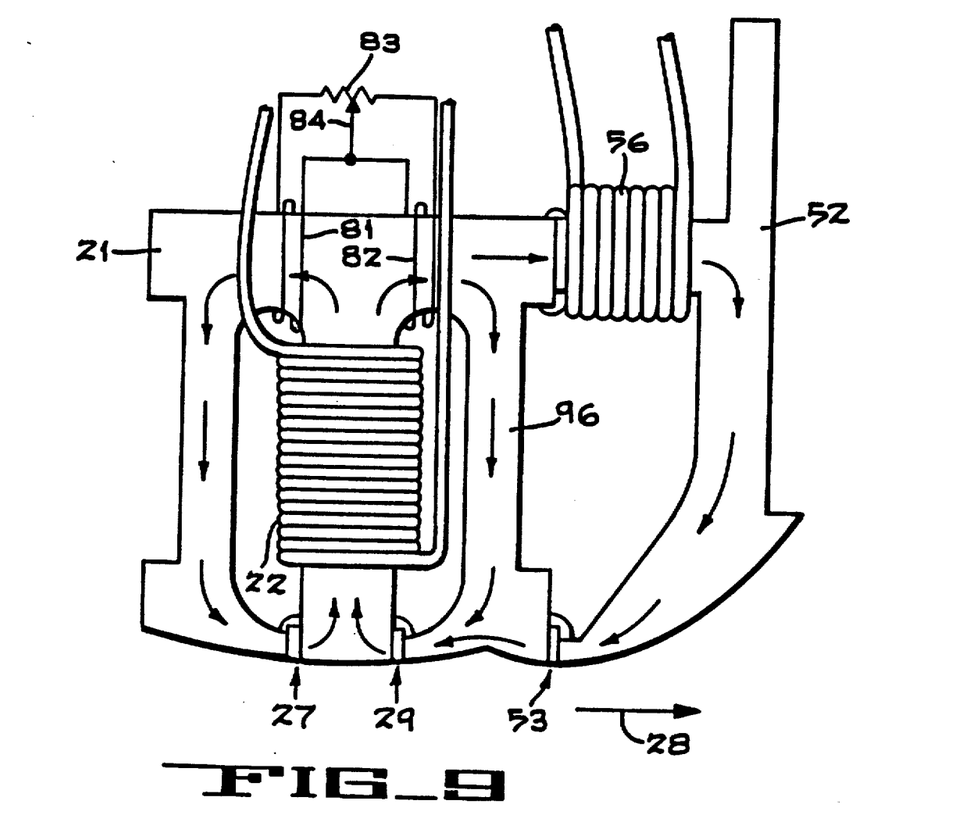
FIG. 9 is an enlarged plan view of the upper transducer taken along the plane of line 9—9 of FIG. 8.
Figure 10:
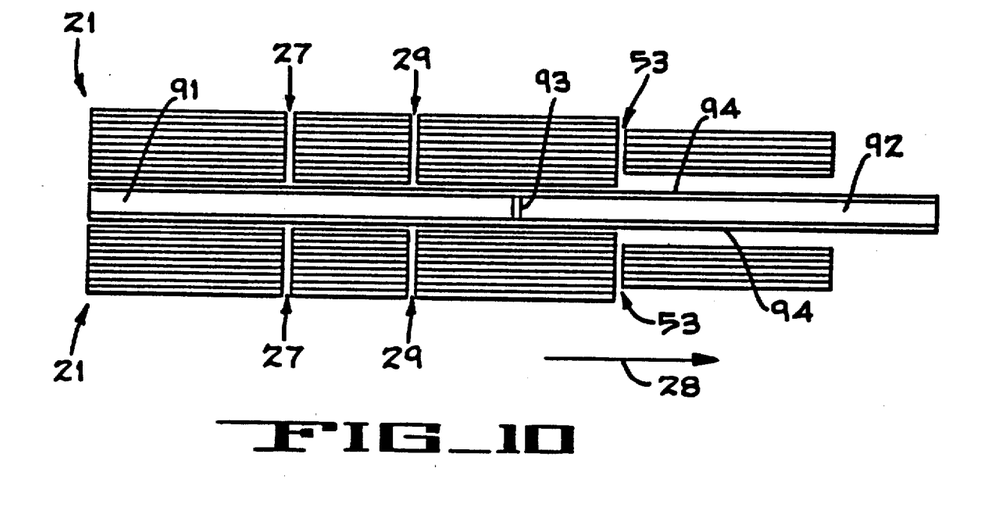
FIG. 10 is an enlarged view of the structure enclosed in line 10—10 of FIG. 8.

Referring now to FIGS. 8-10, there is shown a variational form of the invention, adding a C-core 52 to define a downstream record-play gap 53, the whole being mounted in a head structure 54 generally similar to the structure 11 of FIG. 2. The same tape 19 is illustrated in phantom, including the same longitudinal tracks 16, 17, 18, and moving in the same direction 28, across similar erase gaps 27, 29.

In this variation, the C-core 52 laminations are fabricated, assembled, lapped and shimmed in the standard manner for state-of-art record-reproduce transducers, and a read-write coil 56 is mounted on the back leg of the C-core.

One advantage of a combination read-write-erase head is is that material and space are saved; also, the record field inside the core is in parallel with one of the in-core erase fields during record mode, so that in effect the erase core and the record core are magnetically coupled, and other savings become possible, such as using only a single bias driver for both record and erase circuits, as will be seen in the following description of the circuit.

Figure 11:
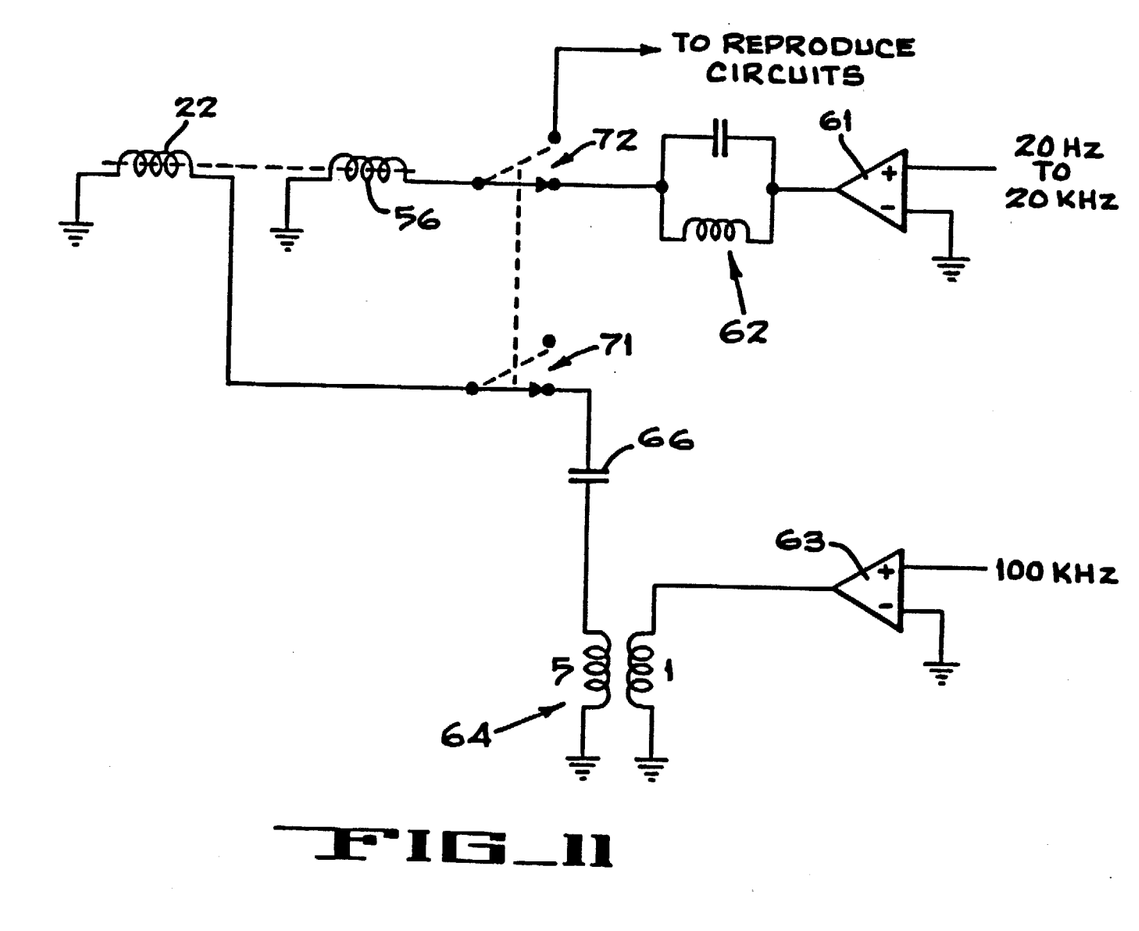
FIG. 11 is a circuit diagram illustrating the operation of the apparatus of FIGS. 8—10.

The driving circuit for the combination head of the invention is shown in FIG. 11, wherein the record signal at 20–20,000 Hz is input to a record amplifier 61, which is coupled to an inductance-capacitance (LC) circuit 62, and this in turn is coupled to the record coil 56.

Likewise, a 100 KHz erase drive signal is applied to an amplifier 63, and the output thereof is stepped-up in voltage in a transformer 64. The output of the transformer is coupled to the erase coil 22 through a resonant capacitor 66, and the two circuits are energized for record mode by a switch 71 ganged with a switch 72, which also may be used to isolate the drivers from the record coil 56 during reproduce mode, when of course the erase head is not energized.

Because the two fields for the erase gap 29 and the record gap 53 are magnetically linked by the downstream leg 96 (FIG. 9) of the core structure, the erase signal also operates as the bias signal for the record function. Thus, only one driver 63 is needed in place of two.

As shown in FIG. 9, a degree of flexibility in operation is provided by a pair of coils 81, 82 on the back legs of both core erase circuits. These coils 81, 82 adapt the system to use low-coercivity oxide tapes at one time, and high-coercivity tapes at another time. For high-coercivity recording, optimum record sensitivity may require twice the signal output (measured e.g., in ampere-turns) as for the oxide tapes. Signal strength for oxide tapes is reduced to the optimum level suitable for low-coercivity recording. If signal strength is too high, an undesirable diffusing effect exists, and if signal strength is too low, then magnetization of the tape is insufficient. When signal strength is thus reduced, it becomes desirable to control the flux distribution of the double erase gap separately from that of the record gap.

The problem is solved in the present invention by linking the pair of windings 81,82 to the back legs of the respective erase gap core portions; these windings being coupled in parallel to a potentiometer comprising a resistance 83 and a manually-movable tap 84. So long as the tap is centered to balance the bridge, the flux in the two erase gap fields remains balanced. Such a setting might be used, e.g., for high coercivity tapes. In such case, when it is desired to shift to oxide tapes, the tap 84 is moved to the right as shown in the drawing, so as to tend to short out the coil 82 associated with the downstream erase gap 29 closest to the record gap 53. As illustrated by the arrows drawn inside the cores, the field of gap 29 lies in parallel with that of record coil 56, and shorting out the coil 82 causes an increase in the field of gap 27, which in turn generates a back e.m.f. acting on the field of gap 29 so as to correspondingly reduce the erasing flux at that gap.

The net effect of the control circuit 81-84 is to make the erase and record bias functions independently adjustable, even though they are mechanically linked by the parallel magnetic circuits of gaps 29 and 53. This effect makes it possible to optimize power consumption, record bias, and depth of erasure, without sacrificing the advantages of a combination erase-record-read head: namely fewer amplifiers and other circuitry, and savings in space and other parts.

Another feature of this invention is illustrated in FIG. 10, which shows the lower pair of transducers 21 from FIG. 8, namely the control track and timing transducers.

Because the gaps of these transducers are so close together, some form of magnetic shielding is required between them. Accordingly, a shield member 91 of soft (or oxygen-free) copper is placed between the corresponding pairs of erase gaps 27 and 29, this material being appropriate for the high-frequency erase signals that are used.

However, the record gaps 53 are used with both high and low frequency signals, and require a different material. Accordingly, a shield 92 is provided, made of mu-metal or Permalloy.

The joint 93 between shields 91 and 92 is located as far as possible from both sets of gaps 29 and 53, and a pair of sandwiching beryllium copper plates 94 are bonded to both shields to provide structural support and integrity to the shielding structure. One of the advantages of this structure for the shielding function, particularly in combination with the structure shown in FIG. 9, is that it enables a unitary one-part construction for the entire shield piece 91, 92, 94 and the avoidance of a break in the shield near the record gap. Previously in the art, when a single-gap erase core was made in two parts, a separate shield member had to be installed between adjacent erase transducers at the time the two parts of each transducer were assembled and potted in the same head assembly. If a record-play C-core was then to be added, both the C-core and the erase core had to be lapped at their to-be-confronting surfaces for better fit, and this need forclosed the possibility of having a one-part shield extending beyond the lapping plane for use between the record C-cores. Instead, a second half-shield had to be potted between the C-cores and that assembly lapped before final assembly with the erase core structure. The resulting disadvantage was that the shield was broken just at the plane of the record gap and was therefore less effective.

In effect, such structure was a three-part construction, too complex for introduction of a one-part shield.

The present invention, however, uses only a two-part construction for the structure of FIG. 9, and the resulting simplicity of assembly permits the use of a one-part shield and the avoidance of any break in the structural integrity of the shield at the plane of the record gap, or any other gap.

What is claimed is:

1. An erase-write-read magnetic transducer structure comprising:
   an E-shaped magnetically permeable core member having central, back and outer arms and having a first coil linked with the central arm and having the back and outer arms passing around the outside of said first coil and defining with the central arm two pairs of confronting pole piece portions constituting a pair of erasing transducing gaps of low magnetic permeability;

the back arm of said core member having two control coils linked therewith, and a potentiometer connected in parallel with said control coils for altering the flux balance there between, whereby during the record mode of operation the record and erase functions of said transducer structure may be optimized independently of one another;

said core member also having a magnetically-permeable C-shaped extension portion and a second electrically-conducting coil passing around the outside thereof and defining a pair of confronting pole piece portions constituting a write-read transducing gap of low magnetic permeability.

2. An erase-write-read magnetic transducer structure comprising: said transducer structure comprising a pair of transducers, each transducer including an E-shaped magnetically permeable core member having central, back and outer arms and having a first coil linked with the central arm and having the back and outer arms passing around the outside of said first coil and defining with the central arm two pairs of confronting pole piece portions constituting a pair of erasing transducing gaps of low magnetic permeability, and said core member also having a magnetically-permeable C-shaped extension portion and a second electrically-conducting coil passing around the outside therof and defining a pair of confronting pole piece portions constituting a read-write transducing gap of low magnetic permeability;

said pair of transducers being mounted in close parallel relationship for tracing adjacent tracks in movement with respect to a recording medium;

a unitary, one-piece magnetic shielding member mounted in parallel with and between said transducers of said pair for minimizing cross-talk between said transducers;

said shielding member having an erase shield portion and a read-write shield portion in the same plane between and parallel to said transducers and said portions being made of different materials; the erase shield portion being disposed between the erase gaps of said respective transducers, and the read-write shield portion being disposed between the read-write gaps of said respective transducers, said shield portions having a joint therebetween located intermediately of each read-write gap and the adjacent erase gaps; and a pair of generally planar web members arranged in sandwiching relation to said erase and read-write shield portions and bonded thereto to form a unitary one-piece shield construction.

3. An erase-write-read magnetic transducer structure comprising: said transducer structure comprising a pair of transducers, each transducer including an E-shaped magnetically permeable core member having central, back and outer arms and having a first coil linked with the central arm and having the back and outer arms passing around the outside of said first coil and defining with the central arm two pairs of confronting pole piece portions constituting a pair of erasing transducing gaps of low magnetic permeability, and said core member also having a magnetically-permeable C-shaped extension portion and a second electrically-conducting coil passing around the outside thereof and defining a pair of confronting pole piece portions constituting a read-write transducing gap of low magnetic permeability;

said pair of transducers being mounted in close parallel relationship for tracing adjacent tracks in movement with respect to a recording medium;

a unitary, one-piece magnetic shielding member mounted in parallel with and between said transducers of said pair for minimizing cross-talk between said transducers;

said shielding member having a soft copper erase shield portion and a mu-metal read-write shield portion in the same plane between and parallel to said transducers;

the erase shield portion being disposed between the erase gaps of said respective transducers, and the read-write shield portion being disposed between the read-write gaps of said respective transducers; and a pair of generally planar beryllium copper web members arranged in sandwiching relation to said erase and read-write shield portions and bonded thereto to form a unitary one-piece shield construction.

* * * * *